April 7, 1959      A. G. THOMAS      2,880,625

BACKLASH COMPENSATOR

Original Filed June 14, 1954

INVENTOR.
Albert G. Thomas

United States Patent Office

2,880,625
Patented Apr. 7, 1959

2,880,625

BACKLASH COMPENSATOR

Albert G. Thomas, Chattanooga, Tenn., assignor to Industrial Controls Corporation, Chattanooga, Tenn., a corporation of Tennessee Original application June 14, 1954, Serial No. 436,653. Divided and this application December 12, 1956, Serial No. 627,922

9 Claims. (Cl. 74—440)

This invention relates to means for eliminating backlash or for compensating for backlash in gear systems, indexing members, and drives or devices of various kinds. This application is divided from my co-pending application Serial No. 436,653 filed June 14, 1954.

It has long been known that backlash is a troublesome factor in mechanisms which require accuracy of operation as, for instance, in lathes, milling machines, indexing machines, and in numerous machine tools, instruments, and other devices. Prior efforts to eliminate backlash troubles have not produced satisfactory results since, even if previous backlash compensating devices were adjusted to overcome some of the difficulty, the trouble soon reappeared, particularly after a little use. There have been other difficulties such as excessive friction, limited load-carrying ability, and additional limitations in prior anti-backlash devices.

In order to overcome the above and other faults of previously known anti-backlash devices, it is an object of the present invention to provide an automatic backlash compensating device or system which can be applied to milling machines and other machine tools or devices of any suitable kind.

Another object is to provide backlash compensating means which need little or no adjustment over extended periods.

A further object is to provide automatic backlash compensating means which compensate for any degree of backlash and for variations or changes of the degree of backlash.

An additional object is to provide a mechanical device which can be used with machine tools, instruments, gear drives, screw feeds, or devices to eliminate or reduce backlash to a negligible factor.

A further object is to provide indicating or indexing devices in which backlash is reduced to a minimum, or largely eliminated.

Other objects and advantages of this invention will be apparent in the following description when taken in connection with the accompanying drawings, in which.

Figure 1:
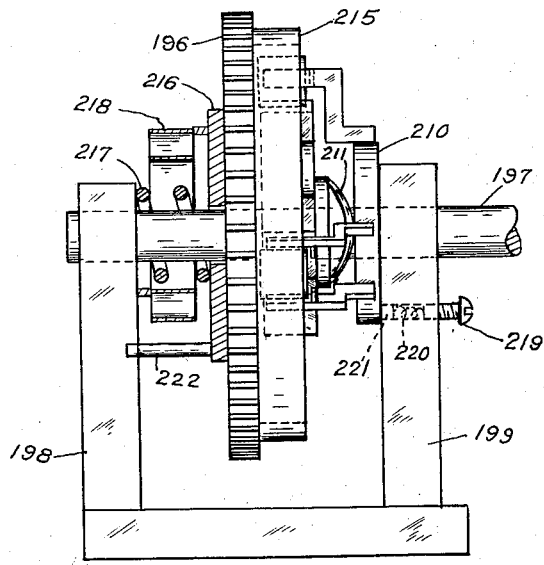
Fig. 1 is an edge view of anti-backlash spur gear or similar mechanism.
Figure 2:
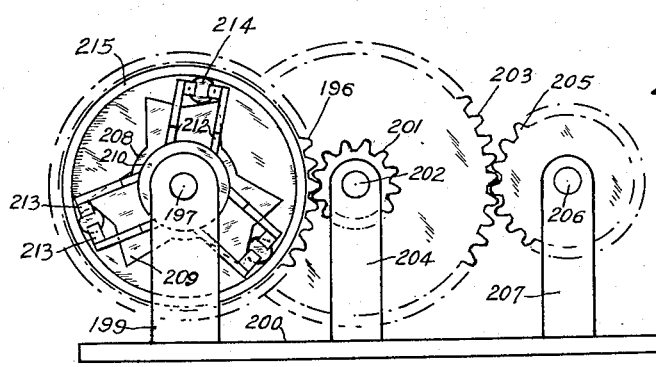
Fig. 2 is a face view of the device of Fig. 1, showing a train of gears and associated mechanism.

In Figures 1 and 2, drive gear 196 floats on shaft 197 which is rotatable in bearings in posts 198 and 199 extending from base 200. Gear 196 is meshed with pinion 201 fastened to shaft 202 to which gear 203 is also rigidly attached. Shaft 202 is rotatable in a bearing in post 204 and in a bearing in a similar post on the opposite side of gear 203. These posts are fastened to base 200. Gear 203 is meshed with gear 205 which is fastened to shaft 206 which is rotatable in a bearing in post 207 and in a similar post on the opposite side of gear 205. These posts are also fastened to base 200. The gears described constitute a gear train driving shaft 206 when gear 196 is turned. Spider 208 having integral V cams 209 is fastened to shaft 197. Annular metal or other ring or disc 210 surrounds shaft 197 and is normally pressed against the adjacent face of post 199 by spring washer or other spring 211. Due to the friction between flattened annulus 210 and post 199, arms 212 attached to ring 210, tend to lag behind rotary displacements of shaft 197 and attached cams 209. Arms 212 are bent as shown and have ears 213 serving as end stops for rollers 214 which are guided and displaced by the arms which may be resilient if desired. These rollers are of such diameter that they do not engage the inner surface of ring 215 when they are at the center or point of shortest radius of the cams, but they do engage ring 215 when the cams are shifted through a small angle to the right or left of the central position.

As shown in Fig. 1, annular ring 215 is fixed to a face of gear 196 coaxially therewith. Annular washer or ring 216 floats on shaft 197 and is pressed against the contiguous face of gear 196 by compression spring 217 between post 198 and washer 216. Spiral spring 218 surrounds shaft 197 and has one end attached to washer 216, the other end of the spring being fastened to post 198. Screw 219 threaded into a hole in post 199 may be adjusted to compress spring 220 which forces plug 221 against washer 210 to provide adjustable friction. Spring 211 could be eliminated.

In operation, if shaft 197 is rotated by any means in counter clockwise direction as seen in Fig. 2, the right hand cam surfaces of elements 209 will quickly move rollers 214 into tight contact with the inner surface of ring 215, since arms 212 are yieldingly held in position by friction washer 210. When a tight locking action is effected between cams 209, rollers 214, and ring 215; gear 196 is driven by shaft 197 and arms 212 and attached disc 210 are also rotated. Therefore, shaft 206 will be rotated by means of the gear train shown. When shaft 197 is reversed in direction, arms 212, rollers 214, and washer 210 are temporarily held in position as a result of friction and cam 209 is swung clockwise through a small angle until the left hand cam surface (Fig. 2) forces the rollers into locking relationship with ring 215 so that gear 196 is rotated in opposite or clockwise direction. In the meantime, however, as cams 209 are rotated clockwise, the short radius centers of the cams pass under the rollers so that there is no locking action between the cams and ring 215. When this happens, spring 218, which has been wound to a degree by rotation of gear 196 and washer 216, snaps back, quickly rotating gear 196 and the other meshed gears in clockwise direction until all the backlash is taken up. The strength of spring 218 is sufficient to rotate the gears while backlash is being taken up, but is not strong enough to rotate shaft 206 which may be provided with a light brake, if desired. Shortly after rollers 214 are released, allowing take-up of backlash, the left hand surfaces of cams 209 force rollers 214 into locking relationship with ring 215 and gear 196 is then rotated by shaft 197. Spring 218 will operate to return gear 196 to fully meshed position, for either direction of rotation. The compression of spring 217 can be arranged so that the degree of friction between washer 216 and gear 196 is sufficient to stress spring 218 enough to take up backlash, but will also allow slippage after gear 196 is rotated through an appreciable angle. Spring 218 should be strong enough to cause quick take-up of backlash as shaft 197 and cams 209 are reversed in direction. Double rollers can be used if desired to limit the necessary relative movement of the cams. Gear 196 will quickly reverse the direction of winding spring 218 when the direction of rotation of the gear is reversed, but a release mechanism can be used, allowing the spring to return to neutral or unstressed position at each reversal. Pin 222 may be attached to washer 216 so that it will strike post 198 and will limit angular movement of the washer and attached spring. The movement should, however, be enough to take up all the backlash. The free movement of shaft 197 can be small and is more or less constant.

Figures 3, 4:
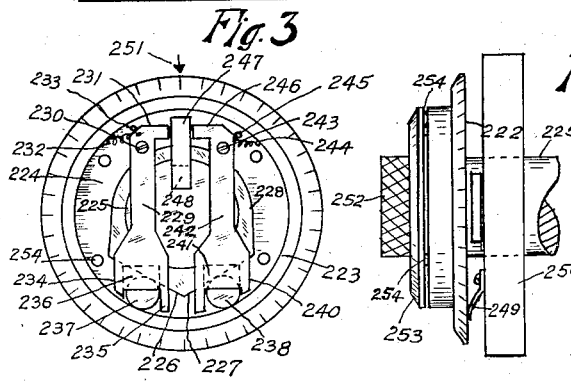
Fig. 3 is a front view of a dial type shaft position indicator and mechanism for causing movement of the dial only after backlash has been taken up.
Fig. 4 is an edge view of the device of Fig. 3.

In Figures 3 and 4, dial 222, having projecting concentric ring 223, is rotatable on annular ring 224 which is rotatable on shaft 225. This shaft drives some part of a machine or device. For instance, the shaft can be threaded to move a lathe tool, a milling machine table, a lathe carriage, or the like. Oppositely sloping cams 226 and 227 are integral with ring 224 and bearing ring 228 which is rotatable on shaft 225. Arm 229 is fastened to ring 224 by pivot screw 230 and has integral lug 231. Spring 232, attached to arm 229 and to ring 224, may be used to pull arm 229 against stop 233. Arm 229 has integral yoke arms 234 and 235 and connecting end web 236 to serve as a cage for roller 237 which is preferably ground and hardened, as are cam surfaces 226 and 227 and roller 238. This roller is caged by yoke arms 239 and 240 and web 241, integral with arm 242 which is fastened to ring 224 by means of pivot screw 243. Tension spring 244, attached to arm 242 and to ring 224, may be used to pull arm 242 normally against stop 245 on ring 224. Lug 246 is integral with arm 242 and is situated closely adjacent to lug 247 projecting forward from integral key 248 pressed into a groove in shaft 225. Lug 231 is likewise situated closely adjacent to lug 247. As shown in Fig. 4, spring strip 249 may be attached to fixed plate or other machine part 250 and will rub against the adjacent surface of dial 222, to provide frictional drag. Index mark 251 is placed on plate 250. Knob 252 and attached or integral flange 253 are fastened to ring 224 by means of posts, bolts, or screws 254.

In operation, knob 252 is turned to rotate shaft 225 through the agency of cam 226 and roller 237 or through cam 227 and roller 238 and associated ring 223. If knob 252 and attached ring 224 are rotated counter clockwise, as seen in Fig. 3, then lug 246 will quickly strike lug 247 and arm 242 will be rotated counter clockwise about pivot 243 to bring roller 238 into wedged or locking position between cam 227 and ring 223. When that happens, dial 222 will be rotated, against the retarding friction of spring 249. Spring 244 is adjusted to have sufficient tension to cause arm 242 to hold roller 238 out of locking engagement with cam 227 and ring 223 until the backlash in the gearing connected with shaft 225 has been taken up. When take-up has been accomplished, however, the resistance offered to rotation of shaft 225 will increase and the reactive force applied to lug 246 by lug 247 will be sufficient to overcome the tension of spring 244 and, accordingly, arm 242 will be swung about pivot 243 to cause ring 223 and dial 222 to be driven by knob 252 and ring 224. This device, therefore, automatically compensates for backlash, driving the dial only after backlash has been taken up, for either direction of rotation. It is obvious that a similar action occurs when knob 252 and ring 224 are rotated in the opposite or clockwise direction; lug 231 striking lug 247 and rotating arm 229 clockwise about pivot 230 to move roller 237 into locking engagement with cam 226 and ring 223.

Arm 234 is preferably parallel with arm 235, allowing radial movement of roller 237, with respect to pivot 230, or, these arms could allow radial movement of the roller with respect to the center of shaft 225. Arms 239 and 240 are arranged to allow similar movement for roller 238. When arms 229 and 242 are held against stops 233 and 245 by respective springs 232 and 244, the rollers are held in positions with relation to the cams so that rotary movement of ring 224 does not rotate dial 222. It is only when lug 231 or lug 246 strikes lug 247 that the rollers are moved into locking position. The lugs and pivots 230 and 243 should be of sufficiently rugged construction to drive shaft 225.

It will be observed that, due to the short lever arms of lugs 231 and 246, and the long effective lever arms of rollers 237 and 238, relatively small movements of ring 224 will cause locking or unlocking of the rollers with respect to driving dial 222. Springs 232 and 244 of course cause the unlocking action. Dial 222 can therefore be made to follow with considerable accuracy the movements of the shaft or other element finally driven as a result of rotation of shaft 225. The final shaft or element can be braked to the desired degree to insure the operation of the roller-carrying arms 229 and 242.

The power feed devices described can of course be actuated manually or by motors or other means.

What I claim is:

1. In a gear system for reducing backlash, a driving gear, driven gear means associated with said driving gear, rotary means adapted to drive said driving gear in either direction, means for connecting said rotary means and said driving gear, said connecting means and said rotary means being adapted temporarily to disconnect said driving gear and said rotary means upon reversal of direction of movement thereof, resilient means for rotating said driving gear to take up backlash in said gear system while said rotary means and said driving gear are disconnected, and friction clutch means connecting said resilient means and said driving gear.

2. The device as described in claim 1, and including friction means for braking the movement of said connecting means.

3. In a gear system, a driving shaft, a driven shaft, a plurality of gears associated therewith, cam means attached to said driving shaft, rollable means for locking said cam means into driving relationship with one of said gears for either direction of rotation thereof, said cam means being adapted to make said driving relationship ineffective momentarily upon reversal of direction of rotation of said driving shaft and cam means, and spring means for rotating said gears to take up backlash while said driving shaft is momentarily disconnected.

4. The device of claim 3, and including means offering yielding resistance to rotation of said rollable means about the axis of said driving shaft.

5. In a gear system, a driving shaft, a driven shaft, a plurality of gears associated therewith, means for effectively connecting said driving shaft with said gears for either direction of rotation and for effectively disconnecting momentarily said driving shaft from said gears upon reversal of direction of rotation of said driving shaft, and resilient means for rotating said gears to take up backlash while said driving shaft is momentarily disconnected, and a friction clutch connecting said resilient means and one of said gears.

6. In a gear system for reducing backlash, a driving gear, driven gear means associated with said driving gear, rotary means adapted to drive said driving gear in either direction, means for connecting said rotary means and said driving gear, said connecting means and said rotary means being adapted temporarily to disconnect said driving gear and said rotary means upon reversal of direction of movement thereof, and means including resilient means for rotating said driving gear to take up backlash in said gear system while said rotary means and said driving gear are disconnected.

7. In a gear system for reducing backlash, a driving gear, driven gear means associated with said driving gear, rotary means adapted to drive said driving gear in either direction, means for connecting said rotary means and said driving gear, said connecting means and said rotary means being adapted temporarily to disconnect said driving gear and said rotary means upon reversal of direction of movement thereof, resilient means for rotating said driving gear to take up backlash in said gear system while said rotary means and said driving gear are disconnected, and slip clutch means connecting said resilient means and said driving gear.

8. The gear system as described in claim 7, and including yielding means for resisting rotary movement of said connecting means.

9. In a gear system for reducing backlash, a driving shaft, a driving gear floating on said shaft, driven gear means associated with said driving gear, rotary means including means fastened to said shaft, said rotary means being adapted to drive said driving gear in either direction, means including means floating on said shaft and adapted operatively to connect said rotary means and said driving gear, said connecting means and said rotary means being adapted temporarily to disconnect operatively said driving gear and said rotary means upon reversal of direction of movement thereof, and means including resilient means for rotating said driving gear to take up backlash in said gear system while said rotary means and said driving gear are operatively disconnected.

References Cited in the file of this patent

UNITED STATES PATENTS

| | | |
|---|---|---|
| 632,455 | Foster | Sept. 5, 1899 |
| 1,968,338 | Earles et al. | July 31, 1934 |
| 2,262,330 | MacNeil et al. | Nov. 11, 1941 |

FOREIGN PATENTS

| | | |
|---|---|---|
| 593,183 | Great Britain | Oct. 10, 1947 |